Oct. 16, 1928.
R. W. HOPE
1,688,235
HINGE FOR CASEMENT WINDOWS
Filed Feb. 23, 1927   2 Sheets-Sheet 1
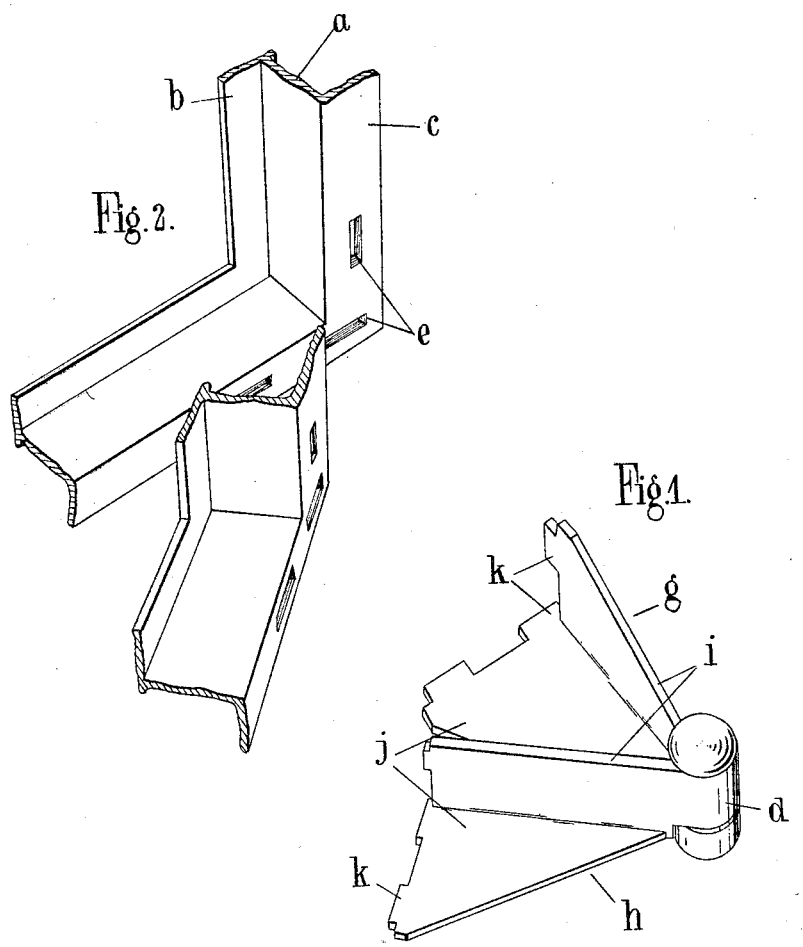

Oct. 16, 1928.
R. W. HOPE
1,688,235
HINGE FOR CASEMENT WINDOWS
Filed Feb. 23, 1927
2 Sheets-Sheet 2
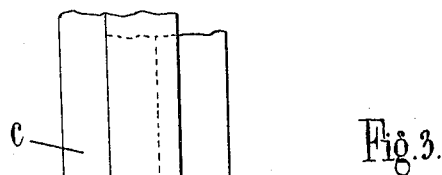
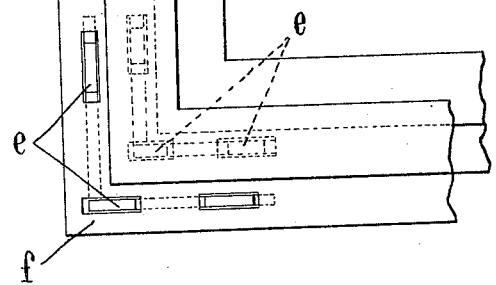
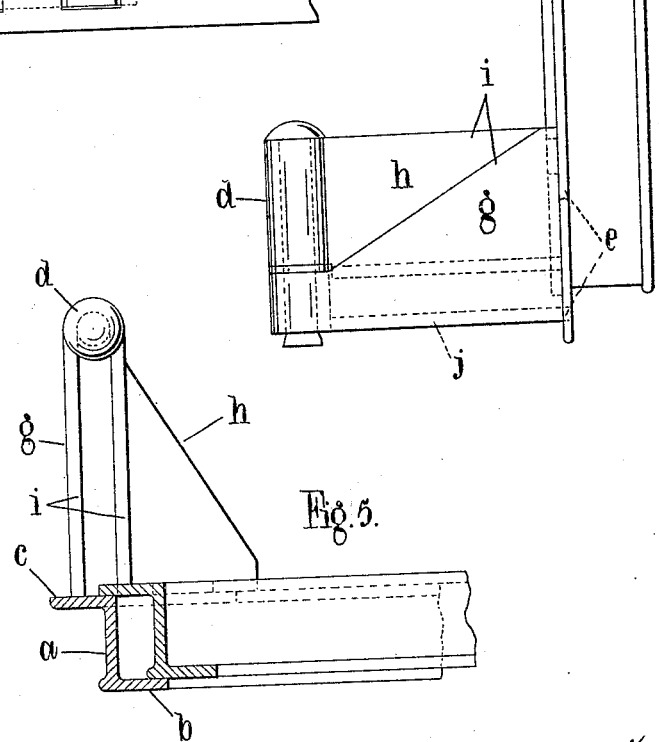

Patented Oct. 16, 1928.

1,688,235

UNITED STATES PATENT OFFICE.

RALPH WALTER HOPE, OF EDGBASTON, BIRMINGHAM, ENGLAND, ASSIGNOR TO HENRY HOPE AND SONS, LIMITED, OF BIRMINGHAM, ENGLAND.

HINGE FOR CASEMENT WINDOWS.

Application filed February 23, 1927, Serial No. 170,376, and in Great Britain March 5, 1926.

This invention relates to the manufacture of hinges for vertically-pivoted side-mounted metal casements in which the swinging part of the casement is mounted by means of a suitable bracket or radius arm at a distance from the pivot.

The object of the present invention is to provide an improved hinge of this character.

The invention in brief consists in a method of hinging metal casements in which the hinge or pivot is disposed at a distance from the casement which comprises the welding of radius arms or brackets to the flanges of the casement sections, for example by slotting or mortising the flanges of the appropriate casement sections, forming projections or tenons on radius brackets approximately fitting into the slots or mortises and applying heat by a welding process to weld the tenons into the slotted flanges so that the finished flange is substantially of the same thickness at the junction as the original flange.

The invention also consists in vertically-hung side-pivoted casements in which radius brackets or arms are welded to the casement flanges.

Referring to the accompanying drawings,

Figure 1 gives a perspective view of a radius arm of a pivot according to one form of the present invention.

Figure 2 is a perspective view of the part of a frame for use with the radius arm of Figure 1.

Figure 3 is a front elevation of a completed hinge with swinging and fixed casement sections viewed from inside the window according to one form of the present invention.

Figure 4 is a plan of Figure 3 and

Figure 5 is a side elevation taken at right angles to Figure 3.

In carrying the invention into effect in the form illustrated by way of example applied to casement sections having a central web $a$ and side flanges $b$ and $c$ so that the section is practically a double L section and dealing with the left-hand casement with hinges on the left hand, looking from the inside of the window, the outside flanges $c$ in the vicinity of the bottom pivot $d$ are slotted or mortised at three places ($e$) near the bottom corner $f$. The width of the slots is approximately equal to the thickness of the radius arms or brackets $g$ and $h$ referred to below with which the sections are to be associated. The hinge comprises the two parts designated as a whole $g$ and $h$ working on the pivot $d$. Each of the parts $g$ and $h$ is in the form of a bracket having vertical walls $i$ and horizontal walls $j$. These may be of any desired length and their ends are formed with tenons $k$ to fit into the slots or mortises $e$ referred to above. The tenons are made secure in the mortises by means of fusion applied by a welding process, after which the flanges are cleaned in any appropriate way so that the finished joint is scarcely visible, particularly after application of the usual coats of paint.

The top hinge is formed on similar lines to the lower hinge.

In this way there is obtained a hinge for the purpose described which is neater in appearance than the previous type of hinge. It avoids the disadvantages of having open slots in the flanges which allow weather to penetrate or perforations of the web to take rivets, which slots or perforations necessarily weaken the section.

Reference in this specification and claim to radius arms or radius brackets includes both arms or brackets and tenons include mortises. Welding may be effected in any convenient manner.

Having now described my invention, what I claim as new and desire to secure by Letters Patent is:—

A hinged casement structure comprising a fixed flanged casement frame and a movable flanged casement frame associated therewith, each of said frames having slots in one of its flanges, a bracket having a plurality of projections cooperating with the slots in the fixed casement frame, a second bracket having projections cooperating with the slots in the movable casement frame, said projections being welded to and terminating substantially flush with the back of said flanges, and a pivot pin connecting said brackets.

In testimony whereof I have signed my name to this specification.

RALPH W. HOPE.